United States Patent [19]

Kitagawa et al.

[11] 4,344,906

[45] Aug. 17, 1982

[54] PROCESS FOR PRODUCING GLASS FIBER-REINFORCED TRANSPARENT CAST SHEET

[75] Inventors: Yoshihiko Kitagawa; Masahiro Yuyama; Masahiko Moritani; Mikio Suzuki, all of Niihama, Japan

[73] Assignee: Sumitomo Chemical Company, Limited, Osaka, Japan

[21] Appl. No.: 222,919

[22] Filed: Jan. 6, 1981

Related U.S. Application Data

[63] Continuation of Ser. No. 69,087, Aug. 23, 1979, abandoned.

[30] Foreign Application Priority Data

Aug. 24, 1978 [JP] Japan .................................. 53-103546

[51] Int. Cl.$^3$ .......................... C08K 7/14; D04H 1/64
[52] U.S. Cl. ..................................... 264/128; 524/531; 524/533
[58] Field of Search ....................... 264/128; 260/42.18

[56] References Cited

U.S. PATENT DOCUMENTS 2,311,613  2/1943  Slayter .............................. 260/42.18
3,968,073  7/1976  Hara et al. ........................ 260/42.18

OTHER PUBLICATIONS

Schildknecht, Vinyl and Related Polymers, John Wiley & Sons, Inc., New York, 1952, pp. 65-67.
Billmeyer, Textbook of Polymer Science, Wiley-Interscience, New York, 1971, p. 343.

*Primary Examiner*—James H. Derrington
*Attorney, Agent, or Firm*—Birch, Stewart, Kolasch & Birch

[57] ABSTRACT

A process for producing glass fiber-reinforced, transparent cast sheets comprising impregnating glass fibers with a resin syrup comprising 10 to 50 parts by weight of a copolymer (A) consisting essentially of 20 to 95% by weight of an aromatic vinyl compound and 5 to 80% by weight of other polymerizable monomer, 1 to 40 parts by weight of an aromatic vinyl compound (B), 50 to 90 parts by weight of other polymerizable monomer (C) and optionally 0.5 to 10 parts by weight of maleic anhydride, and casting the resulting mixture.

12 Claims, No Drawings

PROCESS FOR PRODUCING GLASS FIBER-REINFORCED TRANSPARENT CAST SHEET

This application is a continuation of copending application Ser. No. 069,087, filed on Aug. 23, 1979, now abandoned.

The present invention relates to a process for producing glass fiber-reinforced cast sheets having excellent transparency which contains an aromatic vinyl compound as a component.

Glass fiber-reinforced cast sheets have usually been prepared by impregnating a glass fiber with a resin consisting essentially of methyl methacrylate and followed by casting, by which polymerization of methyl methacrylate proceeds and the resin hardens. The glass fiber-reinforced cast sheets, usually in the form of flat sheets and corrugated sheets, have an excellent weathering resistance and hence have widely been used as various structural materials, such as building materials, lighting sheets for agriculture and cooling towers for outdoor use. These conventional glass fiber-reinforced cast sheets are, however, inferior in transparency because of a difference in refractive index between glass fiber (1.51–1.55) and polymethyl methacrylate (1.49).

Consequently, these cast sheets, either flat or corrugated, are not suitable for usages requiring excellent transparency, so that the range of use of the sheets has markedly been limited.

In order to improve the transparency of the cast sheets, it is proposed to use as the resin a copolymer of methyl methacrylate which is produced by copolymerizing an aromatic vinyl compound, which has a refractive index of from 1.58 to 1.60 when polymerized, with methyl methacrylate in such a weight ratio that the copolymer produced has the same refractive index as that of glass fiber [Japanese Patent Publication (unexamined) No. 45972/1974]. In the copolymerization of methyl methacrylate with an aromatic vinyl compound, however, the rate of polymerization is lower than the case of polymerization of methyl methacrylate alone, and hence, the casting time is prolonged, which results in a reduction in productivity. It was found that this elongation of casting time owing to aromatic vinyl compounds becomes remarkable with an increase in an amount of the compounds. When a polymerization initiator is used in a large amounts, for example, in order to shorten the casting time, there appear various drawbacks, such as foaming of glass fiber-reinforced resins during the casting, a reduction in crazing resistance and a marked reduction in strength.

In order to overcome these drawbacks, various attempts have been proposed, for example, a method comprising pre-polymerizing a monomer such as an aromatic vinyl compound, which causes slow down of the casting rate, prior to the casting; and a method comprising using a resin syrup, which is produced by dissolving a copolymer containing a component of the aromatic vinyl compound in methyl methacrylate [cf. Japanese Patent Publication (unexamined) No. 41368/1978]. It is disclosed in this Japanese Patent Publication that, by using a resin syrup produced by dissolving an acrylonitrile/styrene copolymer in methyl methacrylate the following two conditions can be satisfied: The refractive indices of glass fiber and cast sheet can be made to agree with each other and the elongation of casting time caused by incorporating styrene into the monomer components can be avoided. There is, however, another condition necessary to produce glass fiber-reinforced cast sheets having excellent transparency: The copolymer previously dissolved in methyl methacrylate must be sufficiently compatible with the methyl methacrylate polymer produced by casting and the mixture of both resins must be transparent. As to a method for satisfying the third condition, the foregoing Japanese patent mentions that acrylonitrile/styrene copolymers having a certain range of composition can form a transparent resin mixture together with polymethyl methacrylate.

The present inventors have extensively studied to find an advantageous process for satisfying the foregoing three conditions necessary to produce glass fiber-reinforced cast sheets having excellent transparency. As a result, it has been found that the desired glass fiber-reinforced cast sheets having excellent transparency can be obtained by impregnating a resin syrup comprising a resin component and monomer components into a glass fiber and then casting the resultant, wherein the resin syrup contains as the resin component a copolymer containing a component of an aromatic vinyl compound which acts to elevate a refractive index and contains also as the monomer components an aromatic vinyl compound in addition to the main component of the monomer components (e.g. methyl methacrylate).

The process of the present invention is advantageous in that there can freely and widely be selected the conditions necessary for making the resin mixture transparent with keeping the casting time and refractive index within a certain practical range. For example, the content of the aromatic vinyl compound (e.g. styrene) in the resin syrup (i.e. the total amounts of the aromatic vinyl compound in the resin and monomer components) can be kept at a fixed level by changing mutually the content of the aromatic vinyl compound in both of the resin component and monomer components.

It has also been found that maleic anhydride is effectively added to the resin syrup as the fourth component, by which the casting time of the resin syrup can be shortened and further the conditions for obtaining transparent product can be moderated.

An object of the present invention is to provide an improved process for producing glass fiber-reinforced cast sheets having excellent transparency. Another object of the present invention is to provide a process for producing the glass fiber-reinforced transparent cast sheets at a high rate of casting. Other objects and advantages of the present invention will become apparent from the following description.

According to the present invention, the desired glass fiber-reinforced, transparent cast sheets can be produced by impregnating a glass fiber with a resin syrup which comprises 10 to 50 parts by weight of a copolymer (A) consisting essentially of 20 to 95% by weight of an aromatic vinyl compound and 5 to 80% by weight of other polymerizable monomer, 1 to 40 parts by weight of an aromatic vinyl compound (B), and 50 to 90 parts by weight of other polymerizable monomer (C), and then subjecting the resulting resin syrup impregnated into glass fiber to casting.

The resin syrup used in the present invention can be produced in various manners, for example, by firstly preparing the copolymer (A) and then dissolving the copolymer (A) in a mixture of the above monomers (B) and (C); or by pre-polymerizing a mixture of the above monomers (B) and (C) so that the resulting resin syrup has the composition as mentioned above; or by mixing the resin syrup produced by prepolymerization of the starting monomers and optionally mixing it with other monomers so as to adjust to the composition as mentioned above.

The aromatic vinyl compound includes preferably compounds which are highly polymerizable and are strong in an effect to elevate refractive index, for example, styrene, vinyltoluene, α-methylstyrene, α-methyl-p-methylstyrene, α-methyl-m-methylstyrene, vinylxylene, α-methylvinylxylene, α-chlorostyrene, p-chlorostyrene, m-chlorostyrene, α-methyl-p-chlorostyrene, α-methyl-m-chlorostyrene and α-chlorovinylxylene, which may be used alone or in combination of two or more thereof. For the industrial purpose, styrene, vinyltoluene or α-methylstyrene is preferably used as a main component.

The other polymerizable monomer includes compounds which are copolymerizable with the above aromatic vinyl compound and has one double bond in the molecule, for example, acrylic acid, methacrylic acid, methyl acrylate, methyl methacrylate, ethyl acrylate, ethyl methacrylate, isopropyl acrylate, isopropyl methacrylate, n-propyl acrylate, n-propyl methacrylate, isobutyl acrylate, isobutyl methacrylate, tert-butyl acrylate, tert-butyl methacrylate, n-butyl acrylate, n-butyl methacrylate, cyclohexyl acrylate, cyclohexyl methacrylate, β-hydroxyethyl acrylate, β-hydroxyethyl methacrylate, β-hydroxypropyl acrylate, β-hydroxypropyl methacrylate, glycidyl acrylate, glycidyl methacrylate, 2-cyanoethyl acrylate, 2-cyanoethyl methacrylate, β-ethoxyethyl acrylate, β-ethoxyethyl methacrylate, 2-ethylhexyl acrylate, 2-ethylhexyl methacrylate, acrylonitrile, methacrylonitrile, N,N-dimethylaminoethyl methacrylate, acrylamide, methacrylamide, diacetone acrylamide, vinyl acetate and vinyl chloride, which may be used alone or in combination of two or more thereof.

The other polymerizable monomer constituting the copolymer (A) and that contained in the monomer mixture may be the same or different, and in either case the object of the present invention can be achieved. As described above, the resin syrup can be prepared in various manners, and preferred monomers may vary with the preparation manner. Industrially, acrylic acid, methacrylic acid, methyl acrylate, methyl methacrylate, acrylonitrile, methacrylonitrile, β-hydroxyethyl acrylate and β-hydroxyethyl methacrylate are suitable. Particularly, methyl methacrylate is effective as the main component because of its excellent weathering resistance, as described above.

The copolymer (A) consists of 20 to 95% by weight of the aromatic vinyl compound and 5 to 80% by weight of other polymerizable monomer, and the optimum contents of both components vary with the combination of the components within the foregoing ranges. Further, the total contents of the aromatic vinyl compound [i.e. the content as the component of the copolymer (A)+the content as the monomer (B)] in the resin syrup are limited to a proper range in order to make the refractive index of the cast sheet agree with that of glass fiber. For example, it is within the range of 10 to 40% by weight, preferably 15 to 35% by weight, more preferably 20 to 30% by weight, based on the total weight of the resin syrup, when the refractive index of glass fiber is about 1.52. Within the above range, a larger portion of the aromatic vinyl compound component may be contained in either of the copolymer (A) or the monomer mixture, in other words, the content of the aromatic vinyl compound may be biased to either of them. Consequently, the contents of the aromatic vinyl compound component in both parts can properly be selected within fairly wide ranges.

The resin syrup may optionally contain maleic anhydride in an amount of 0.5 to 10 parts by weight. Thus, when maleic anhydride is contained, the resin syrup comprises 10 to 50 parts by weight of the copolymer (A), 1 to 40 parts by weight of the aromatic vinyl compound (B), 50 to 90 parts by weight of other polymerizable monomer (C) and 0.5 to 10 parts by weight of maleic anhydride (D).

When the content of the copolymer (A) is over 50 parts by weight, the viscosity of the resin syrup becomes too high, so that it is not practical in terms of defoaming and impregnation of glass fiber. On the other hand, the content of less than 10 parts by weight is not desirable because the desired effect of a resin syrup is lost.

When the content of other polymerizable monomer is less than 50 parts by weight, the good weathering resistance owing to the other polymerizable compound, particularly methyl methacrylate, is lost. Besides, the content of more than 90 parts by weight is also undesirable because it becomes impossible to make the refractive index of the cast sheet agree with that of glass fiber. When the content of maleic anhydride is less than 0.5 part by weight, the effect of the anhydride is small, while when the content is more than 10 parts by weight, the weathering resistance is sometimes reduced depending on the composition of the resin syrup.

Furthermore, a polyfunctional unsaturated monomer such as ethylene glycol dimethacrylate, ethylene glycol diacrylate, trimethylolpropane triacrylate and pentaerythritol triacrylate may optionally be added to the resin syrup in order to improve the properties of glass fiber-reinforced cast sheets. The suitable amount of the polyfunctional unsaturated monomer is up to 10% by weight, more preferably 0.1 to 5% by weight, based on the total weight of the syrup.

The viscosity of the resin syrup is kept within a proper range so as to make the syrup easily miscible with glass fibers and to facilitate the removal of air bubbles. For the practical purpose, the viscosity is within the range of 0.2 to 100 poises, preferably 0.5 to 20 poises, at 25° C. In the same meaning, the intrinsic viscosity of the copolymer (A) is also kept within the proper range of 0.1 to 2.0 dl/g, preferably 0.15 to 1.5 dl/g, at 25° C. in chloroform.

The resin syrup may also optionally contain other conventional additives, such as polymerization inhibitors, ultraviolet absorbers and fillers, in such an amount that the objects of the present invention can be achieved.

Equipments used in applying the process of the present invention are not particularly limited, if they are equipments for the production of flat or corrugated glass fiber-reinforced resin sheets. It is a matter of course that the process of the present invention can be carried out by using equipments for the production of glass fiber-reinforced unsaturated polyester resin sheets.

In carrying out the process of the present invention casting may be carried out in a mold having a required shape made of glass, cellophane (cellulose film), polyester film, polyvinyl alcohol film, polyethylene film, polypropylene film, aluminum, iron or stainless steel, or may be carried out between two pieces of continuously moving belts made of stainless steel or the above film to produce flat sheets or corrugated sheets. The products thus obtained may further be processed by thermoforming.

The glass fibers used in the present invention are well-known ones, and their shape may be any of roving, surfacing mat, chopped strand, chopped strand mat, satin, checked weave, plain weave, twill elastic webbing and net. Any type of glass fibers such as E-type glass fibers and C-type ones may be used. The weight ratio of glass fibers to the resin syrup is the same as usually used, and preferred amount of glass fibers is generally 10 to 40% by weight based on the weight of cast sheet.

In the present invention, the casting temperature i.e. a temperature at which the resin syrup impregnated into the glass fiber is cast, is not particularly limited, but preferably it is within the range of 50° to 100° C. A polymerization initiator is used for the casting, but the kind thereof is not particularly limited. Suitable examples of the polymerization initiator are azo compounds such as azobisisobutyronitrile, azobisdimethylvaleronitrile and azobiscyclohexanenitrile; peroxides such as benzoyl peroxide, lauroyl peroxide, acetyl peroxide, capryl peroxide, 2,4-dichlorobenzoyl peroxide, isobutyryl peroxide, acetylcyclohexyl sulfonyl peroxide, tert-butyl peroxypivalate, tert-butyl peroxyisobutyrate, tert-butyl peroxy-2-ethylhexanoate, isopropyl peroxydicarbonate, sec-butyl peroxy-dicarbonate, n-butyl peroxydicarbonate and bis(4-tert-butylcyclohexyl)peroxydicarbonate; and redox initiators containing the above peroxide as one component. These initiators may be used alone or in combination of two or more thereof.

In the present invention, glass fiber-reinforced cast sheets are produced by impregnating or mixing glass fibers with the resin syrup, followed by casting. The casting temperature may be kept constant during the casting, or may be changed stepwise or continuously. After the casting, the product may further be subjected to a heat-treatment in order to decrease the content of residual monomers in the cast sheet. In general, the heat-treatment is preferably carried out at a temperature of 110° to 150° C.

The glass fiber-reinforced, transparent cast sheets of the present invention can be produced in a low cost since the casting is accomplished within a short period of time in a high production efficiency, and furthermore they are superior in transparency. Consequently, they are widely used as building materials or structural materials for agricultural use.

The present invention will be illustrated specifically with reference to the following examples, which are not however to be interpreted as limiting the invention thereto.

In the following examples, transparency was evaluated by the visual examination of the resulting glass fiber-reinforced cast sheets.

EXAMPLES 1 TO 3

One hundred parts by weight of a mixture of styrene and methyl methacrylate (the mixed ratio by weight of the both compounds is shown in Table 1), 150 parts by weight of water, suspension stabilizers [i.e. 0.024 parts by weight of sodium polyacrylate, 0.3 parts by weight of disodium hydrogen phosphate and 0.015 part by weight of water-soluble cellulose (Metolose ®, produced by Shin-etsu Chemical Industry Co., Ltd.)] and 2 parts by weight of azobisisobutyronitrile as a polymerization initiator were charged in a reactor equipped with a stirrer. After replacing air in the reactor by nitrogen, the mixture was heated to 93° C. under nitrogen atmosphere and polymerized at this temperature for 2 hours. The copolymer (A) thus obtained was washed with water and dried. This copolymer (A) had an intrinsic viscosity (at 25° C., as chloroform solution) as shown in Table 1.

In 30 parts by weight of the copolymer (A) obtained above were dissolved 70 parts by weight of a monomer mixture of styrene, methyl methacrylate, ethylene glycol dimethacrylate and maleic anhydride (the weight ratio of the four compounds is shown in Table 1) to give a resin syrup. Thereafter, 1.5% by weight of benzoyl peroxide (100% solid, hereinafter referred to as "BPO") as an initiator for casting was dissolved in the resin syrup, which was then deaerated under reduced pressure. One hundred parts by weight of the syrup was injected into a mold uniformly filled with 25 parts by weight of glass fibers of a chopped strand form (refractive index 1.52). After impregnating the glass fibers with the resin syrup, casting was carried out by dipping the mold in a heating bath of 85° C. During the casting, a rise in temperature by polymerization heat and a time required to reach the maximum temperature were measured. The time is shown in Table 1 as a casting time. After the maximum temperature was reached, the reaction product was cooled to room temperature and taken out of the mold to obtain a glass fiber-reinforced cast sheets of about 5 mm in thickness. The transparency of the cast sheet is as shown in Table 1.

TABLE 1

|  |  |  |  | Example 1 | Example 2 | Example 3 |
|---|---|---|---|---|---|---|
|  | Copolymer (A) | Intrinsic viscosity (dl/g) |  | 0.32 | 0.32 | 0.32 |
|  |  | Composition | MMA (% by weight) | 74 | 74 | 74 |
|  |  |  | ST (% by weight) | 26 | 26 | 26 |
| Resin Syrup |  | Amount (part by weight) |  | 30 | 30 | 30 |
|  | Monomer Mixture | Composition | ST (% by weight) | 21.7 | 21.7 | 21.7 |
|  |  |  | MMA (% by weight) | 74.0 | 72.6 | 71.1 |
|  |  |  | EGDM (% by weight) | 1.43 | 2.86 | 1.43 |
|  |  |  | MAH (% by weight) | 2.86 | 2.86 | 5.71 |
|  |  | Amount (part by weight) |  | 70 | 70 | 70 |
| Viscosity of resin syrup (poise) |  |  |  | 1.9 | 1.9 | 1.9 |
| Amount of glass fiber (part by weight) |  |  |  | 25 | 25 | 25 |
| Initiator | Kind |  |  | BPO | BPO | BPO |
|  | Amount (% by weight based on the resin syrup) |  |  | 1.5 | 1.5 | 1.5 |
| Casting | Temperature (°C.) |  |  | 85 | 85 | 85 |
|  | Time (min) |  |  | 19.4 | 16.0 | 13.7 |

TABLE 1-continued

|  | Example 1 | Example 2 | Example 3 |
|---|---|---|---|
| Transparency | Transparent | Transparent | Transparent |

MMA: Methyl methacrylate,
MAH: Maleic anhydride,
EGDM: Ethylene glycol dimethacrylate,
ST: styrene,
BPO: Benzoyl peroxide

EXAMPLES 4 TO 7

In 20 parts by weight of an acrylonitrile/styrene copolymer [Grade CD produced by Daicel Ltd., acrylonitrile (28% by weight)/styrene (72% by weight) copolymer] were dissolved 80 parts by weight of a monomer mixture of styrene, methyl methacrylate, ethylene glycol dimethacrylate and maleic anhydride [the weight ratio of the four compounds is shown in the column "Monomer mixture" in Table 2] to give a resin syrup.

In the same manner as described in Examples 1 to 3, glass fiber-reinforced cast sheets were prepared from the resin syrup obtained above, wherein an initiator shown in Table 2 was used. The results are shown in Table 2.

TABLE 2

|  |  |  |  | Example 4 | Example 5 | Example 6 | Example 7 |
|---|---|---|---|---|---|---|---|
| Resin Syrup | Copolymer (A) | Intrinsic viscosity (dl/g) |  | 1.03 | 1.03 | 1.03 | 1.03 |
|  |  | Composition | AN (% by weight) | 28 | 28 | 28 | 28 |
|  |  |  | ST (% by weight) | 72 | 72 | 72 | 72 |
|  |  | Amount (part by weight) |  | 20 | 20 | 20 | 20 |
|  | Monomer Mixture | Composition | ST (% by weight) | 16.3 | 16.3 | 7.5 | 16.3 |
|  |  |  | MMA (% by weight) | 77.5 | 75.0 | 85.6 | 76.3 |
|  |  |  | EGDM (% by weight) | 1.25 | 1.25 | 1.89 | 2.50 |
|  |  |  | MAH (% by weight) | 5.0 | 7.5 | 5.0 | 5.0 |
|  |  | Amount (part by weight) |  | 80 | 80 | 80 | 80 |
| Viscosity of resin syrup (poise) |  |  |  | 3.3 | 3.3 | 3.7 | 3.3 |
| Amount of glass fiber (part by weight) |  |  |  | 25 | 25 | 25 | 25 |
| Initiator | Kind |  |  | BPO | BPO | PV | BPO |
|  | Amount (% by weight based on the resin syrup) |  |  | 1.5 | 1.5 | 1.5 | 1.5 |
| Casting | Temperature (°C.) |  |  | 85 | 85 | 85 | 85 |
|  | Time (min) |  |  | 16.1 | 12.7 | 6.9 | 13.0 |
| Transparency |  |  |  | Transparent | Transparent | Transparent | Transparent |

AN: Acrylonitrile,
ST: Styrene,
MMA: Methyl methacrylate,
EGDM: Ethylene glycol dimethacrylate,
MAH: Maleic anhydride,
BPO: Benzoyl peroxide.
PV: 50% Tert-butyl peroxypivalate solution in toluene

EXAMPLES 8 AND 9 AND REFERENCE EXAMPLES 1 AND 2

A resin syrup was prepared in the same manner as in Example 4 except that 73 parts by weight of a monomer mixture as shown in Table 3 was added to 27 parts by weight of the same acrylonitrile/styrene copolymer as used in Example 4.

By using the resin syrup thus obtained, a glass fiber-reinforced resin plate was prepared in the same manner as described in Example 1, wherein a polymerization initiator as shown in Table 3 was used. The results are shown in Table 3.

TABLE 3

|  |  |  |  | Example 8 | Example 9 | Reference Example 1 | Reference Example 2 |
|---|---|---|---|---|---|---|---|
| Resin Syrup | Copolymer (A) | Composition | AN (% by weight) | 28 | 28 | 28 | 28 |
|  |  |  | ST (% by weight) | 72 | 72 | 72 | 72 |
|  |  | Amount (part by weight) |  | 27 | 27 | 27 | 27 |
|  | Monomer Mixture | Composition | ST (% by weight) | 4.1 | 4.1 | 0 | 0 |
|  |  |  | MMA (% by weight) | 94.5 | 91.8 | 95.9 | 98.6 |
|  |  |  | EGDM (% by weight) | 1.4 | 1.4 | 1.4 | 1.4 |
|  |  |  | MAH (% by weight) | 0 | 2.7 | 2.7 | 0 |
|  |  | Amount (part by weight) |  | 73 | 73 | 73 | 73 |
| Amount of glass fiber (part by weight) |  |  |  | 25 | 25 | 25 | 25 |
| Initiator | Kind |  |  | TBN | PV | PV | PV |
|  | Amount (% by weight based on the resin syrup) |  |  | 1.5 | 1.5 | 1.5 | 1.5 |
| Casting | Temperature (°C.) |  |  | 75 | 80 | 80 | 80 |
|  | Time (min) |  |  | 8.9 | 7.6 | 6.3 | 6.1 |
| Transparency |  |  |  | Transparent | Transparent | Somewhat | Somewhat |

TABLE 3-continued

|  | Example 8 | Example 9 | Reference Example 1 | Reference Example 2 |
|---|---|---|---|---|
|  |  |  | opaque | opaque |

AN: Acrylonitrile,
MMA: Methyl methacrylate,
EGDM: Ethylene glycol dimethacrylate,
ST: Styrene,
MAH: Maleic anhydride,
TBP: Bis(4-tert-butylcyclohexyl) peroxydicarbonate,
PV: 50% Tert-butyl peroxypivalate solution in toluene The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A process for producing a glass fiber-reinforced, transparent cast sheet, which comprises impregnating glass fibers with a resin syrup comprising
   10 to 50 parts by weight of a copolymer (A) consisting essentially of 20 to 95% by weight of an aromatic vinyl compound and 5 to 80% weight of other polymerization monomer,
   1 to 40 parts by weight of an aromatic vinyl compound (B),
   50 to 90 parts by weight of other polymerizable monomer (C), and
   0.5 to 10 parts by weight of maleic anhydride, and casting the resulting mixture.

2. A process according to claim 1, wherein the aromatic vinyl compound in the copolymer (A) and the aromatic vinyl compound (B) is each a member selected from the group consisting of styrene, vinyltoluene, α-methylstyrene, α-methyl-p-methylstyrene, α-methyl-m-methylstyrene, vinylxylene, α-methylvinylxylene, α-chlorostyrene, p-chlorostyrene, m-chlorostyrene, α-methyl-p-chlorostyrene, α-methyl-m-chlorostyrene, α-chlorovinylxylene and a mixture thereof.

3. A process according to claim 2, wherein the aromatic vinyl compound is a member selected from the group consisting of styrene, vinyltoluene and α-methylstyrene.

4. A process according to claim 1, wherein the other polymerizable monomer in the copolymer (A) and the other polymerizable monomer (C) is each a member selected from the group consisting of acrylic acid, methacrylic acid, methyl acrylate, methyl methacrylate, ethyl acrylate, ethyl methacrylate isopropyl acrylate, isopropyl methacrylate, n-propyl acrylate, n-propyl methacrylate, isobutyl acrylate, isobutyl methacrylate, tert-butyl acrylate, tert-butyl methacrylate, n-butyl acrylate, n-butyl methacrylate, cyclohexyl acrylate, cyclohexyl methacrylate, β-hydroxyethyl acrylate, β-hydroxyethyl methacrylate, β-hydroxypropyl acrylate, β-hydroxypropyl methacrylate, glycidyl acrylate, glycidyl methacrylate, 2-cyanoethyl acrylate, 2-cyanoethyl methacrylate, β-ethoxyethyl acrylate, β-ethoxyethyl methacrylate, 2-ethylhexyl acrylate, 2-ethylhexyl methacrylate, acrylonitrile, methacrylonitrile, N,N-dimethylaminoethyl methacrylate, acrylamide, methacrylamide, diacetone acrylamide, vinyl acetate, vinyl chloride, and a mixture thereof.

5. A process according to claim 4, wherein the other polymerizable monomer is a member selected from the group consisting of acrylic acid, methacrylic acid, methyl acrylate, methyl methacrylate, acrylonitrile, methacrylonitrile, β-hydroxyethyl acrylate and β-hydroxyethyl methacrylate.

6. A process according to claim 1, wherein said copolymer (A) has an intrinsic viscosity of 0.1 to 2.0 dl/g in chloroform at 25° C.

7. A process according to claim 6, wherein said copolymer (A) has an intrinsic viscosity of 0.15 to 1.5 dl/g in chloroform at 25° C.

8. A process according to claim 1, wherein said resin syrup has a viscosity of 0.2 to 100 poises at 25° C.

9. A process according to claim 8, wherein said resin syrup has a viscosity of 0.5 to 20 poises at 25° C.

10. A process according to claim 1, wherein a polyfunctional unsaturated monomer is contained in said resin syrup.

11. A process according to claim 10, wherein said polyfunctional unsaturated monomer is contained in an amount of up to 10% by weight of the resin syrup.

12. A process according to claim 10, wherein said polyfunctional unsaturated monomer is a member selected from the group consisting of ethylene glycol diacrylate, ethylene glycol dimethacrylate, trimethylolpropane triacrylate, pentaerythritol triacrylate and a mixture thereof.

* * * * *